United States Patent
Ledford et al.

(10) Patent No.: US 6,247,175 B1
(45) Date of Patent: Jun. 12, 2001

(54) METHOD AND APPARATUS FOR IDENTIFYING AND REMOVING UNUSED SOFTWARE PROCEDURES

(75) Inventors: Bruce Alan Ledford; Nicholas Richard Stewart, both of Raleigh, NC (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/218,814

(22) Filed: Dec. 22, 1998

(51) Int. Cl.[7] .................................................. G06F 9/44
(52) U.S. Cl. ................................................... 717/9
(58) Field of Search .................................... 717/9

(56) References Cited

U.S. PATENT DOCUMENTS

| | | | |
|---|---|---|---|
| 5,457,799 | * 10/1995 | Srivastava | 717/9 |
| 5,499,340 | * 3/1996 | Barritz | 714/47 |
| 5,828,883 | * 10/1998 | Hall | 717/4 |
| 5,974,249 | * 10/1999 | Elliott et al. | 717/4 |
| 5,999,737 | * 12/1999 | Srivastava | 717/9 |
| 6,023,585 | * 2/2000 | Perlman et al. | 717/11 |
| 6,182,283 | * 1/2001 | Thomson | 717/9 |

OTHER PUBLICATIONS

Tonella et al., Points to Analysis for Program Understanding, IEEE, p. 90–99, 1997.*

Yang et al., Automatic Hypertext Link Generation Based on Conceptual Graphs, IEEE, p. 702–705, Sep. 1995.*

* cited by examiner

Primary Examiner—Mark Powell
Assistant Examiner—John Q. Chavis

(57) ABSTRACT

The present invention is a method and apparatus for identifying and removing unused software procedures from computer software loads at loadbuild time, and includes a compiler, linker, and other software loadbuild tools. The compiler has been adapted by the invention to define identify procedures that are unused by a software load by identifying all procedure calls, entry points, and required procedures in each module used by the software load and to incorporate this information into link records. Based on the information contained in the link records, a linker creates a temporal data structure referred to as a call graph that depicts the operational flow of the software load. The linker processes the call graph and determines those procedures that are called, and thus those procedures that are not called by a software load. The linker or other loadbuilding tool is adapted to remove each "not called" procedure from the linked files while maintaining the integrity of the procedure directories by using several different procedure shell methods or by using tombstone values in the procedure directories.

8 Claims, 10 Drawing Sheets

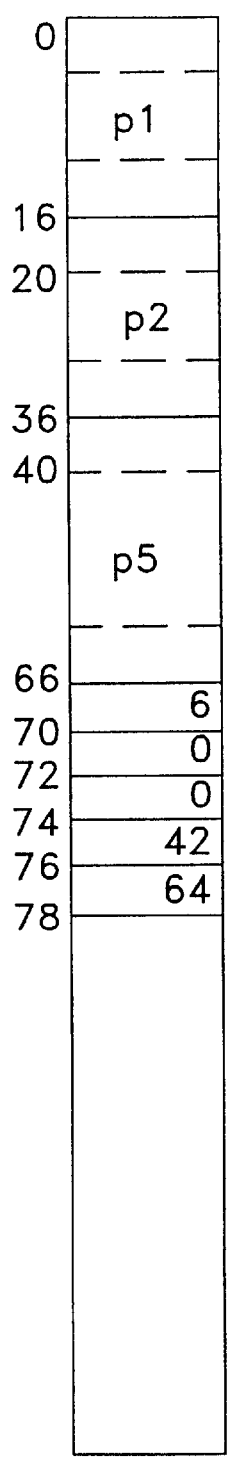
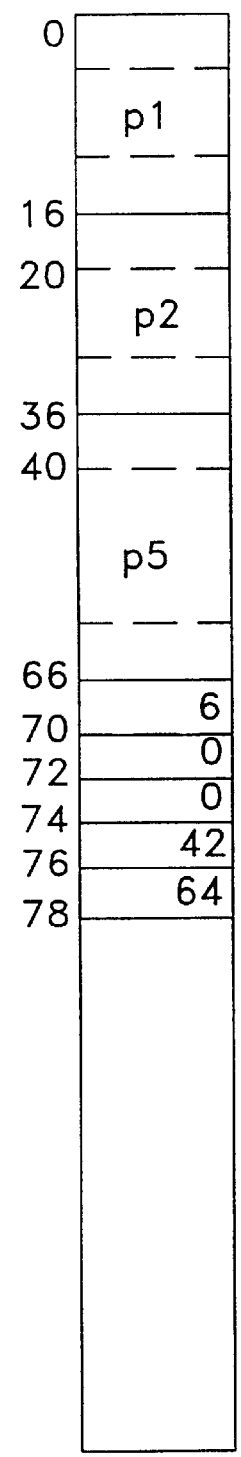
FIG. 8B

METHOD AND APPARATUS FOR IDENTIFYING AND REMOVING UNUSED SOFTWARE PROCEDURES

BACKGROUND OF THE INVENTION

1. Field of the Invention

The present invention relates to a method and apparatus for reducing the memory requirements of software loads, in particular, a method and apparatus for the identification and removal of unused procedures and use of procedure shells to maintain the integrity of the procedure table during computer software loadbuilding time.

2. Description of the Problem Solved

In the telephonic industry, consumer demand for additional telephonic functionality increases the software load on the telephonic computer hardware designated to execute such loads. The increase in software load decreases the remaining life of the computer hardware. At some point, the computer hardware cannot handle additional functionality and a telephonic vendor has to stop delivery of features, upgrade the hardware, or reduce the load while maintaining increased functionality. Thus, there is a need to provide computer software for increasing the software load capacity on telephonic computer hardware. Such computer software should extend the life of telephone switch hardware by reducing the hardware memory requirement of telephone switch software, and also reduce the memory requirement of computer software of Extended Peripheral Modules (XPMs). XPMS are the telephony hardware that implement many of the various telephony computer software applications. For example, XPMs can collect digits, link different telecompanies and private networks, track data, manage communication between trunks, manage residential telephone lines, and control telephone tone generation, as well as handling such software driven applications as speed dialing. The present invention relates to computer software and a method for preserving computer memory by recognizing those computer program procedures not used in a particular software load and then removing them during loadbuilding.

The term "loadbuilding" is used herein to refer to the compiling and linking of computer code to produce the final software load. The term "software load" is used herein to refer to the final computer software that is executed by computer hardware for a particular application. A software load is developed from high-level computer language referred to as source code. The source code file of a software load is compiled by one of a number of compilers as are well known in the field to produce an object code file. Object code files are linked together by a linker to produce the software load, which can then be executed by the machine (computer hardware such as a XPM or PC). In particular applications, the source code, for example, written in Pascal, is compiled into an intermediate language identified as pcode. Xysco™, a software building tool developed by Nortel, takes the link code file and converts time critical sections from pcode to object code.

Software loads are comprised of modules. A module is a portion of a software load that carries out a specific function and may be used alone or with other modules. Within each module are self-contained blocks of software called procedures. If a particular application or load requires a procedure in a particular module, the linker pulls in the entire module, along with all procedures contained in the module. By way of example, FIG. 1 illustrates three modules A, B, and C. Each module contains three procedures: ap1, ap2, and ap3; bp1, bp2, and bp3; and cp1, cp2, and cp3, respectively. It is understood that modules can contain substantially more than three procedures.

Referring again to FIG. 1, if software load L1 requires ap1, bp2, and cp2, a compiler would first compile source code to object code and then a linker or other suitable software building tool would link together the modules containing these procedures into software load L1, i.e., would place into L1 each module A, B, and C and all procedures contained therein. Similarly, software load L2 requires ap2, bp3, and cp3. Again, during loadbuilding, the linker would link together the modules containing these procedures to form software load L2, i.e., would place into L2 each module A, B, and C and all procedures contained therein. Despite the different procedures required by software loads L1 and L2 and despite each not needing all of the procedures contained in modules A, B, and C, during loadbuilding, the traditional linker links together all three modules A, B, and C, and all procedures contained therein to form software loads L1 and L2. Clearly, when building software loads, presently used linkers will create loads that take up valuable computer hardware memory for procedures that are not implemented when the load is executed. (The computer memory used by a particular software load is referred to herein as a "memory footprint.")

The present invention recognizes that it would be advantageous to, during this software loadbuilding process, for compilers, linkers, and other software loadbuilding tools such as Xsyco™ to identify the procedures that are not used in the final software load and remove them, thereby creating a smaller computer memory footprint having the same functionality as the software load built using traditional compilers, linkers, and other software building tools.

With the foregoing in mind, it becomes a general object of the present invention to extend the service life of hardware by removing unused procedures from a software load resident on such hardware.

It is another object of the present invention to recognize unused procedures contained within modules used to build particular software loads.

It is a further object of the present invention to define all procedures, all required procedures, and entry points within each module.

It is yet another object of the invention to remove unused procedures during the loadbuilding process.

It is a further object of the invention to use procedure shells to maintain the integrity of each linked segment and corresponding procedure directories.

It is an object of the invention to use a placeholder, or tombstone, in the procedure directory to maintain the integrity of the procedure directory.

SUMMARY OF THE INVENTION

The present invention solves the above problems by providing a method and apparatus for identifying and removing unused procedures from computer software loads, while maintaining the integrity of the procedure directory, at loadbuild time, and includes a compiler, linker, and other software loadbuild tools. The compiler is adapted to define all procedures contained within software modules and to incorporate them into module link records. The compiler is further adapted to identify all module procedure calls, entry points into the software load, and required procedures, and to create call and required procedure lists to also incorporate into link records. Based on the information contained in the link records, the linker of the present invention creates a temporal data structure referred to as a call graph and a procedure management table that records the operational flow of the software load and the "call"/"not called" status of each procedure contained in the link record. To determine the procedures that are unused ("not called") by a software load, the linker initially sets the status of each procedure of each module used by the software load to "not called", and goes through a call graph processing method to determine which procedures are actually "called" by the software load, updating the procedure management table as it proceeds through the call graph processing method. Once the linker completes the call graph processing operation, the procedure management table has identified the procedures that are "called" by a particular software load. The remaining procedures are "not called" and are, thus, recognized by the linker as those procedures to remove from the software load. The present invention removes each "not called" procedure from the linked files while maintaining the integrity of the procedure tables by using one of several different procedure shell methods or by using what is referred to herein as the tombstone method.

BRIEF DESCRIPTION OF THE DRAWINGS

FIGS. 7A, 7B, 8A, and 8B show in block diagram form the removal of unused procedures from segment 2 of software load main1 in accordance with the tombstone method of the present invention.

DETAILED DESCRIPTION OF PREFERRED EMBODIMENT OF THE INVENTION

The present invention identifies and removes unused procedures from computer software loads. In the preferred embodiment, the present invention is used to remove unused procedures from the Pascal component of XPM loads at the loadbuild time. However, it is understood that the present invention can be used during software loadbuilding time as a general software code size reduction method.

1. Identification of Unused Procedures

The particular unused procedures that are targeted for removal at loadbuild time, in accordance with the present invention, depend on the particular load being built. It is recognized by the present invention that the list of unused procedures is different for each load, and that it is therefore necessary to identify the particular set of unused procedures at link time. First, however, the compiler must generate information for the linker. Traditionally, compilers only identify and pass to the linker a module's procedures that are called or referenced by other modules, and do not identify for the linker procedures that are strictly confined to the module. The present invention recognizes that in order to identify and remove unused procedures, every procedure in a module must be defined for the linker. To accomplish this task, the present invention adds unique computer code to the compiler that, upon execution, looks for and defines each procedure contained in a software program module, and incorporates the defined procedures into a link record.

It is further recognized by the present invention that in order to identify all unused procedures in a final software load, all procedure calls and entry points within each module must also be identified. An entry point refers to a procedure that is the doorway or start of the execution for the software load. There may be more than one entry point for each software load. Load entry points would include: (1) all segment initialization procedures; (2) an initiated task; (3) all handlers for an initiated task; and (4) any procedure exported to C++. The above set of entry point procedures would also include procedures called by these entry procedures or bound via procedure variants in these procedures. During the compilation, the compiler looks for and identifies all procedure calls and entry points within each module and incorporates a procedure call list for each such module into the link record.

Figure 1:
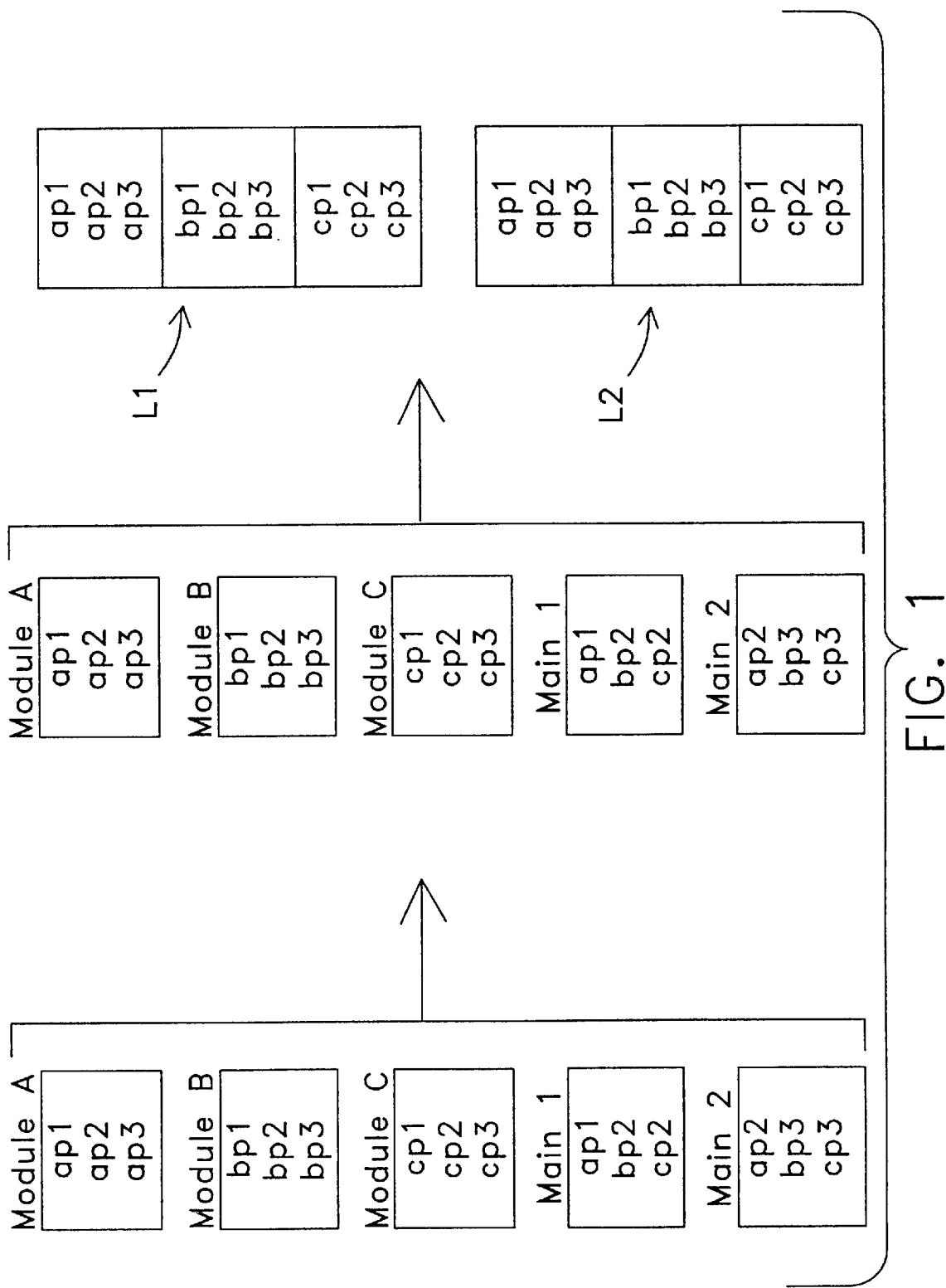
FIG. 1 is a functional block diagram showing the form, compilation of modules A, B, and C, main1, and main2 from source code files to object code files and linking of object code files to form main1 and main2 software loads.
Figure 2:
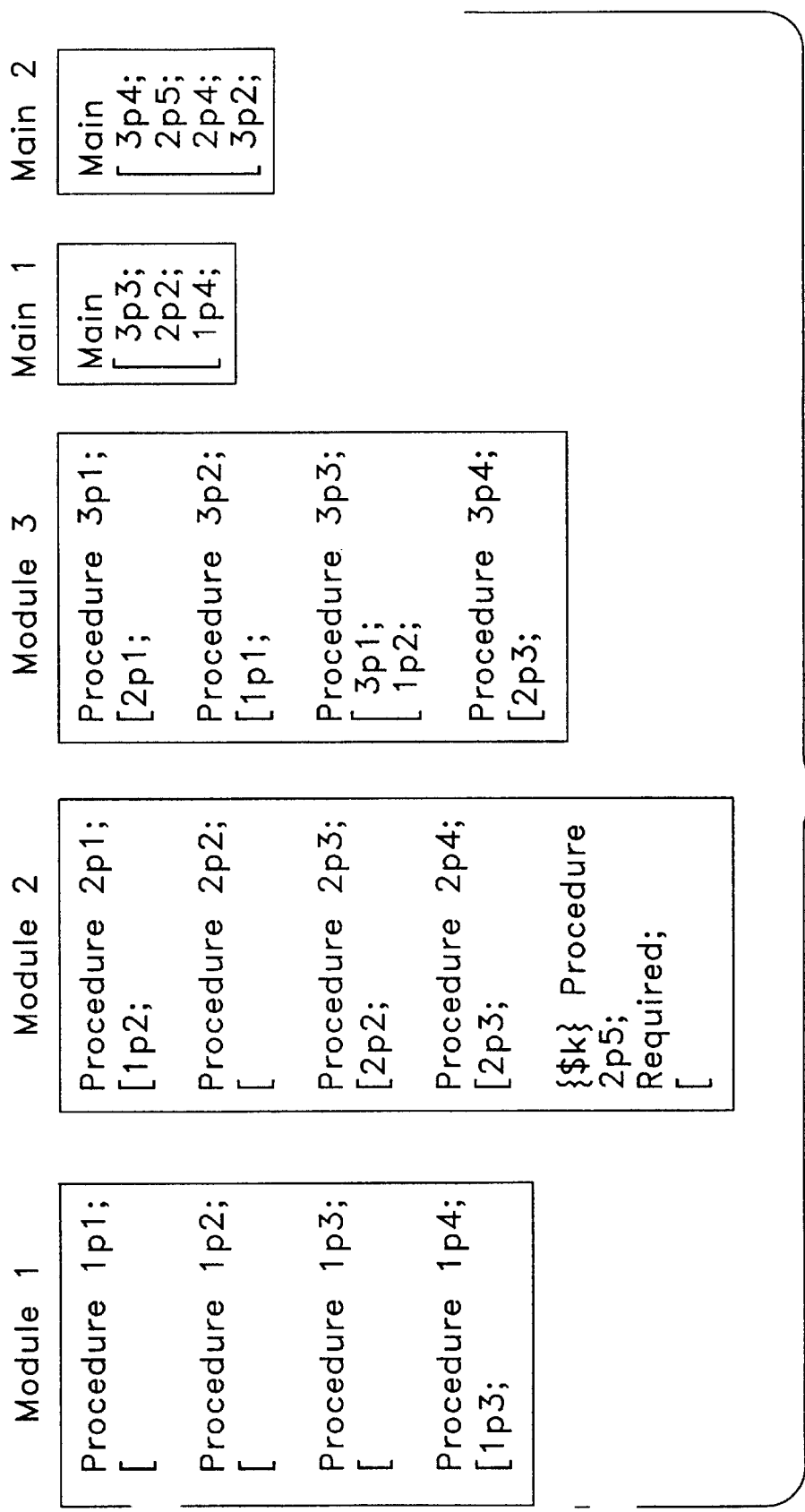
FIG. 2 is a functional block block diagram showing the form of modules 1, 2, 3, main1, and main2 and the procedures contained therein.

It is also recognized by the present invention that most software loads require procedures that are not called by a particular module. These procedures are referred to herein as "required procedures." The compiler of the present invention includes unique computer code that enables the compiler to look for these required procedures. Required procedures can be identified, as shown in FIG. 2 as those files that the programmer has previously associated with the mark{$k}. For example, procedure 2p5 is marked as a required procedure. Additional required procedures also include, but may not be limited to, the following: 1) those not referenced in the load but called by the operating system or loader (e.g. the STAC procedure of the COMPRESS module, or the initialization procedure); and, 2) those reserved for later use (e.g. procedures reserved for patching). Software code of the compiler present invention, when executed would add each required procedure to link record.

In summary, to initiate the process for identifying those procedures that are unused by a particular software load, the compiler of the present invention: (1) looks for and defines each procedure contained in a software program module and generates a definitions list of all such procedures; (2) looks for all calls and entry points within the module and generates a call list for that module; (3) looks for all required procedures contained in the module and generates a list of such calls, and (4) creates link records for each module containing the defined procedures, call list, entry points, and required procedures list for processing by the linker.

By way of example, FIG. 2, depicts each module 1, 2, 3, main1, and main2, each containing procedures, and indicates those procedures that are required and called as follows. Module 1 contains procedures 1p1, 1p2, 1p3, and 1p4. FIG. 2 shows that procedure 1p4 calls 1p3. Module 2 contains procedures 2p1, 2p2, 2p3, 2p4, and 2p5. Module 2 shows that procedures 2p1, 2p3, and 2p4 call procedures 1p2, 2p2, and 2p3 respectively. Procedure 2p5 is shown as a required procedure of module 2 by the mark {$k} FIG. 2 further shows that module 3 contains procedures 3p1, 3p2, 3p3, and 3p4 and that procedure 3p1 calls 2p1, procedure 3p2 calls 1p1, procedure 3p3 calls two procedures, 3p1 and 1p2, and procedure 3p4 calls 2p3. Finally, main1 calls 3p3, 2p2, and 1p4, and main2 calls 3p4, 2p5, 2p4, and 3p2.

The compiler of the invention creates link records for each module as follows:

Module 1
    Defines 1p1
    Defines 1p2
    Defines 1p3
    Defines 1p4
    1p4 calls 1p3

Module 2
    Defines 2p1
    Defines 2p2
    Defines 2p3
    Defines 2p4
    Defines 2p5
    2p1 calls 1p2
    2p3 calls 2p2
    2p4 calls 2p3
    Required 2p5

Module 3
    Defines 3p1
    Defines 3p2
    Defines 3p3
    Defines 3p4
    3p1 calls 2p1
    3p2 calls 1p1
    3p3 calls 3p1
    3p3 calls 1p2
    3p4 calls 2p3

Main1
    Defines main
    main calls 3p3
    main calls 2p2
    main calls 1p4
    Required main Main2
    Defines main
    main calls 3p4
    main calls 2p5
    main calls 2p4
    main calls 3p2
    Required main The linker processes the link records created by the compiler and creates a temporal data structure referred to as a call graph. The call graph is referred to as "temporal" because it is not carried through and incorporated into the final software load. Call graphs show the operational flow of the software load. The call graph includes a node for each procedure contained in the link records. Each node contains the following information:

1. the module where the procedure is defined;
    2. procedure name and number;
    3 whether the procedure is required;
    4. status (called, not called); and
    5. list of callees.

The linker also creates a procedure management table, which consists of information from each procedure node for each module. The structure of the procedure management table is clearly set forth below. In the preferred embodiment of the invention, to determine which procedures are called, the following definitions and instructions are used by the linker of the invention, which definitions and instructions are included by way of example only.

```
called_proc_node_ptr=^called_proc_node;
called_proc_node=record
    called_proc: pm_proc_id; {segment #/procedure#}
    next: called_proc_node_ptr;
end; {called_proc_node}
pm_call_status={pm_not_called, pm_called,
    pm_reprocessed; pm_removed);
pm_proc_type=(pm_unknown_proc, pm_asm_proc,
    pm_pcode_proc);
pm_mgmt_rec=record
    {NOTE: proc num is determined by the cell-index.}
    proc_name: alpha;
    call status: pm_call_status;
    called_procs : called_proc_note_ptr; {list of called
        procedures}
end; {pm_mgmt_rec}
```

Initially, the linker sets the status of each procedure to "not called." Once the linker determines that the procedure is called, it changes its status from "not called" to "called." In accordance with the call graph processing operation of the invention, the linker looks to the link records (as set forth above) for required procedures, and finds procedure 2p5 as a member of required list, and changes the status of the required procedure 2p5 from "not called" to "called" in the procedure management table. The linker then looks at 2p5's call list and determines that 2p5 does not call any procedures. The linker finds itself at the end of the 2p5's call list and its first call-processing loop, and begins its second loop by processing main program 1 from the required list.

The linker marks main1 as "called" and refers to the main1 procedure management table and finds that 3p3 is first listed on main1's call list. Linker then changes the status of 3p3 from "not called" to "called," and determines from the procedure management table whether 3p3 has a called list. If it does, it goes to the first called procedure in 3p3's called list, which is 3p1. The linker modifies the procedure management table by changing the status of 3p1 from "not called" to "called." Next, the procedure determines if 3p1 has a called list. If it does, it goes to the first called procedure in 3p1's called list, which is 2p1. The linker modifies the procedure management table by changing the status of 2p1 from "not called" to "called." The linker then determines that 2p1 calls 1p2, marks 1p2 as "called," and discovers that 1p2 does not have a called list, reaching the end of that particular branch of the call graph, whereupon it starts the third loop through the call graph processing.

The linker works itself back to 2p1 to determine if 2p1 has any more procedures in its call list, other than 1p2, which was processed in the second loop of the process. It determines that it does not and ends the third loop without marking any other procedures as "called."

In the fourth loop of the process, the linker works back to the 3p1 call list, and finds that there are no further calls, as 2p1 has already been processed and its status changed from "not called" to "called." It works further back and takes the next called procedure from 3p3 call list, which is 1p2. However, 1p2 has already been marked as called, and the loop is terminated.

The fifth loop essentially asks the question if there are any called procedures of 3p3 beyond ip2, and finds that there are none. At this point, the linker will again work back in the following sixth loop to main1 call list to see if there is a called procedure beyond the first called procedure 3p3, which is 2p2. In the sixth loop the process marks 2p2 as called, and traverses the call list for 2p2, and finds no called procedures.

In the last iteration, the linker processes the next called procedure of main1, which is 1p4, changes the status of 1p4 in the procedure management table from "not called" to "called," and traverses 1p4 call list to find 1p3 is called. The linker marks 1p3 as called, and traverses 2p3's call list to find no called procedures, thereby terminating the call graph processing operation of main1. Importantly, the call graph processing operation of the invention is very efficient, because when a procedure has already been marked as "called," the entire call graph branch behind that already "called" procedure does not have to be processed later during the call graph processing operation, even if it is called within a different call graph branch. Thus, the further along in the call graph processing operation, the less processing that has to be done, because many of the procedures called in the operational flow of the software load, have been called, and thus processed earlier by the call graph processing operation of the invention. By way of further illustration of the above call graph processing operation, the linker loops through the above link records for modules 1–3 and main1 as follows. First illustrated is the call management table as it appears before the call graph processing of the invention.

| Procedure Management Table before Call Graph Processing | | | |
|---|---|---|---|
| Mod table | Proc table | status | call list |
| 1 | 1p1 | not called | |
|  | 1p2 | not called | |
|  | 1p3 | not called | |
|  | 1p4 | not called | 1p3 |
| 2 | 2p1 | not called | 1p2 |
|  | 2p2 | not called | |
|  | 2p3 | not called | 2p3 |
|  | 2p4 | not called | 2p3 |
|  | 2p5 | not called | |
| 3 | 3p1 | not called | 2p1 |
|  | 3p2 | not called | 1p1 |
|  | 3p3 | not called | 3p1, 1p4 |
|  | 3p4 | not called | 2p3 |
| main1 | main1 | not called | 3p3, 2p2, 1p4 |

Required List
main1

First Loop

1. Take first item off required list (2p5).
2. Mark 2p5 as called.
3. Traverses 2p5 call list.
   end of list

| Procedure Management Table after First Loop | | | |
|---|---|---|---|
| Mod table | Proc table | status | call list |
| 1 | 1p1 | not called | |
|  | 1p2 | not called | |
|  | 1p3 | not called | |
|  | 1p4 | not called | 1p3 |
| 2 | 2p1 | not called | 1p2 |
|  | 2p2 | not called | |
|  | 2p3 | not called | 2p3 |
|  | 2p4 | not called | 2p3 |
|  | 2p5 | called | |
|  | 3p1 | not called | 2p1 |
|  | 3p2 | not called | 1p1 |
|  | 3p3 | not called | 3p1, 1p4 |
|  | 3p4 | not called | 2p3 |
| main1 | main1 | not called | 3p3, 2p2, 1p4 |

Required List
main1

Second Loop

1. Take first item off required list (main1)
2. Mark main1 as called
3. Traverse call list for main1
   a. Take first item off main1 call list (3p3).
   b. Mark 3p3 as called.
   c. Traverse call list for 3p3.
      i. Take first item off 3p3 call list (3p1)
      ii. Mark 3p1 as called
      iii. Traverse call list for 3p1
         (a) Take first item off 3p1 call list (2p1)
         (b) Mark 2p1 as called
         (c) Traverse call list for 2p1
            (1) Take first item off 2p1 call list (1p2)
            (2) Mark 1p2 as called
            (3) Traverse call list for 1p2
            —end of list

| Procedure Management Table after Second Loop | | | |
|---|---|---|---|
| Mod table | Proc table | status | call list |
| 1 | 1p1 | not called | |
|  | 1p2 | called | |
|  | 1p3 | not called | |
|  | 1p4 | not called | 1p3 |
| 2 | 2p1 | called | 1p2 |
|  | 2p2 | not called | |
|  | 2p3 | not called | 2p2 |
|  | 2p4 | not called | 2p3 |
|  | 2p5 | called | |
| 3 | 3p1 | called | 2p1 |
|  | 3p2 | not called | 1p1 |
|  | 3p3 | called | 3p1, 1p2 |
|  | 3p4 | not called | 2p3 |
| main1 | main1 | called | 3p3, 2p2, 1p4 |

Required List

Third Loop Through the Call Graph Processing

1. Take first item off required list (main1)
2. Mark main1 as called
3. Traverse call list for main1
   a. Take first item off main1 call list (3p3)
   b. Mark 3p3 as called
   c. Traverse call list for 3p3
      i. Take first item off 3p3 call list (3p1)
      ii. Mark 3p1 as called
      iii. Traverse call list for 3p1

(a) Take first item off 3p1 call list (2p1)
(b) Mark 2p1 as called
(c) Traverse call list for 2p1
   (1) Take first item off 2p1 call list (1p2)
   (2) Mark 1p2 as called
   (3) Traverse call list for 1p2
   (4) Take next item of 2p1 call list ( )
   —end of list Procedure Management Table after Third Loop

| Mod table | Proc table | status | call list |
|---|---|---|---|
| 1 | 1p1 | not called | |
|   | 1p2 | called | |
|   | 1p3 | not called | |
|   | 1p4 | not called | 1p3 |
| 2 | 2p1 | called | 1p2 |
|   | 2p2 | not called | |
|   | 2p3 | not called | 2p2 |
|   | 2p4 | not called | 2p3 |
|   | 2p5 | called | |
| 3 | 3p1 | called | 2p1 |
|   | 3p2 | not called | 1p1 |
|   | 3p3 | called | 3p1, 1p2 |
|   | 3p4 | not called | 2p3 |
| main1 | main1 | called | 3p3, 2p2, 1p4 |

Required list

Fourth Loop Through Call Graph Processing

1. Take first item off required list (main1)
2. Mark main1 as called
3. Traverse call list for main1
   a. Take first item off main1 call list (3p3)
   b. Mark 3p3 as called
   c. Traverse call list for 3p3
     i. Take first item off 3p3 call list (3p1)
     ii. Mark 3p1 as called
     iii. Traverse call list for 3p1
       (a) Take first item off 3p1 call list (2p1)
       (b) Mark 2p1 as called
       (c) Traverse call list for 2p1
          (1) Take first item off 2p1 call list (1p2)
          (2) Mark 1p2 as called
          (3) Traverse call list for i*p*2
       —end of list
          (4) Take next item of 2p1 call list ( )
       —end of list
       (d) Take next item off 3p1 call list ( )
       —end of list
4. Take next item off 3p3 call list (1p2)
5. 1p2 already marked as called—terminate this iteration Procedure Management Table after Fourth Loop

| Mod table | Proc table | status | call list |
|---|---|---|---|
| 1 | 1p1 | not called | |
|   | 1p2 | called | |
|   | 1p3 | not called | |
|   | 1p4 | not called | 1p3 |
| 2 | 2p1 | called | 1p2 |
|   | 2p2 | not called | |
|   | 2p3 | not called | 2p2 |
|   | 2p4 | not called | 2p3 |
|   | 2p5 | called | |
| 3 | 3p1 | called | 2p1 |
|   | 3p2 | not called | 1p1 |
|   | 3p3 | called | 3p1, 1p2 |
|   | 3p4 | not called | 2p3 |
| main1 | main1 | called | 3p3, 2p2, 1p4 |

Required list

Fifth Loop Through Call Graph Processing

1. Take first item off required list (main1)
2. Mark main1 as called
3. Traverse call list for main1
   a. Take first item off main1 call list (3p3)
   b. Mark 3p3 as called
   c. Traverse call list for 3p3
     i. Take first item off 3p3 call list (3p1)
     ii. Mark 3p1 as called
     iii. Traverse call list for 3p1
       (a) Take first item off 3p1 call list (2p1)
       (b) Mark 2p1 as called
       (c) Traverse call list for 2p1
          (1) Take first item off 2p1 call list (i*p*2)
          (2) Mark 1p2 as called
          (3) Traverse call list for 1p2
       —end of list
          (4) Take next item of 2p1call list ( )
       —end of list
       (d) Take next item off 3p1 call list ( )
4. Take next item off 3p3 call list (1p2)
5. 1p2 is already marked as called—terminate this iteration
6. Take next item off 3p3 call list ( )
   —end of list Procedure Management Table after Fifth Loop

| Mod table | Proc table | status | call list |
|---|---|---|---|
| 1 | 1p1 | not called | |
|   | 1p2 | called | |
|   | 1p3 | not called | |
|   | 1p4 | not called | 1p3 |
| 2 | 2p1 | called | 1p2 |
|   | 2p2 | not called | |
|   | 2p3 | not called | 2p2 |
|   | 2p4 | not called | 2p3 |
|   | 2p5 | called | |
| 3 | 3p1 | called | 2p1 |
|   | 3p2 | not called | 1p1 |
|   | 3p3 | called | 3p1, 1p2 |
|   | 3p4 | not called | 2p3 |
| main1 | main1 | called | 3p3, 2p2, 1p4 |

Required list

Sixth Loop Through Call Graph Processing.

1. Take first item off Required list (main1)
2. Mark main1 as called
3. Traverse call list for main1
   a. Take first item off main1 call list (3p3)
   b. Mark 3p3 as called
   c. Traverse call list for 3p3 i. Take first item off 3p3 call list (3p1)
ii. Mark 3p1 as called
iii. Traverse call list for 3p1
  (a) Take first item off 3p1 call list (2p1)
  (b) Mark 2p1 as called
  (c) Traverse call list for 2p1
    (1) The first item off 2p1 call list (1p2)
    (2) Mark 1p2 as called
    (3) Traverse call list for 1p2
      —end of list
    (4) Take next item off 2p1 call list ( )
      —end of list
  (d) Take next item off 3p1 call list ( )
    —end of list
iv. Take next item off 3p3 call list (1p2)
v. ip2 already marked as called—terminate this iteration
vi. Take next item off 3p3 call list ( )
  —end of list
d. Take next item off main call list (2p2)
e. Mark 2p2 as called
f. Traverse call list for 2p2 ( )
  —end of list Procedure Management Table after Sixth Loop

| Mod table | Proc table | status | call list |
|---|---|---|---|
| 1 | 1p1 | not called | |
|  | 1p2 | called | |
|  | 1p3 | not called | |
|  | 1p4 | not called | 1p3 |
| 2 | 2p1 | called | 1p2 |
|  | 2p2 | called | |
|  | 2p3 | not called | 2p2 |
|  | 2p4 | not called | 2p3 |
|  | 2p5 | called | |
| 3 | 3p1 | called | 2p1 |
|  | 3p2 | not called | 1p1 |
|  | 3p3 | called | 3p1, 1p2 |
|  | 3p4 | not called | 2p3 |
| main1 | main1 | called | 3p3, 2p2, 1p4 |

Required list

Seventh Loop Through Call Graph Processing

1. Take first item off Required list (main1)
2. Mark main1 as called
3. Traverse call list for main1
  a. Take first item off main1 call list (3p3)
  b. Mark 3p3 as called
  c. Traverse call list for 3p3
    i. Take first item off 3p3 call list (3p1)
    ii. Mark 3p1 as called
    iii. Traverse call list for 3p1
      (a.) Take first item off 3p1 call list (2p1)
      (b.) Mark 2p1 as called
      (c.) Traverse call list for 2p1
        (1.) Take first item off 2p1 call list (1p2)
        (2.) Mark 1p2 as called
        (3.) Traverse call list for 1p2
          end of list
        (4.) Take next item off 2p1 call list ( )
          end of list
      (d.) Take next item off 3p1 call list ( )
        end of list
    iv. Take next item off 3p3 call list (1p2)
    v. 1p2 already marked as called—terminate this iteration
    vii. Take next item off 3p3 call list ( )
      end of list
  d. Take next item off main call list (2p2)
  e. Mark 2p2 as called
  f. Traverse call list for 2p2 ( )
    —end of list
  g. Take next item off main call list (1p4)
  h. Mark 1p4 as called
  i. Traverse call list for 1p4
    1. Take first item off 1p4 call list (m1p3)
    2. Mark 1p3 as called
    3. Traverse call list for 1p3 ( )
      —end of list Procedure Management Table after Seventh Loop

| Mod table | Proc table | status | call list |
|---|---|---|---|
| 1 | 1p1 | not called | |
|  | 1p2 | called | |
|  | 1p3 | called | |
|  | 1p4 | called | 1p3 |
| 2 | 2p1 | called | 1p2 |
|  | 2p2 | called | |
|  | 2p3 | not called | 2p2 |
|  | 2p4 | not called | 2p3 |
|  | 2p5 | called | |
| 3 | 3p1 | called | 2p1 |
|  | 3p2 | not called | 1p1 |
|  | 3p3 | called | 3p1, 1p2 |
|  | 3p4 | not called | 2p3 |
| main1 | main1 | called | 3p3, 2p2, 1p4 |

Evaluation after Processing Graph Table for Software Load 1

| Mod table | Proc table | status | call list |
|---|---|---|---|
| 1 | 1p1 | not called | |
|  | 1p2 | called | |
|  | 1p3 | called | |
|  | 1p4 | called | 1p3 |
| 2 | 2p1 | called | 1p2 |
|  | 2p2 | called | |
|  | 2p3 | not called | 2p2 |
|  | 2p4 | not called | 2p3 |
|  | 2p5 | called | |
| 3 | 3p1 | called | 2p1 |
|  | 3p2 | not called | 1p1 |
|  | 3p3 | called | 3p1, 1p2 |
|  | 3p4 | not called | 2p3 |
| main1 | main1 | called | 3p3, 2p2, 1p4 |

Required list

In summary, rather than using additional processing power to loop through and identify all procedures unused by a software load, the present method identifies those procedures that are called by a software load, and any procedure that is not called is not included in the list of called procedures and is therefore determined to be unused. Thus, in accordance with the present invention, based on the information now in the procedure management table, procedures 1p1, 2p3, 2p4, 3p2, and 3p4 are "not called," i.e., they are unused procedures with regard to main1, the software load.

Using the call graph processing method of the present invention as described by example and in detail above, the procedure management table for main2 would show that for main2 procedures 1p2, 1p3, 1p4, 2p1, 3p1, and 3p3 are not called, i.e., are unused procedures for software load main2.

Figure 3:
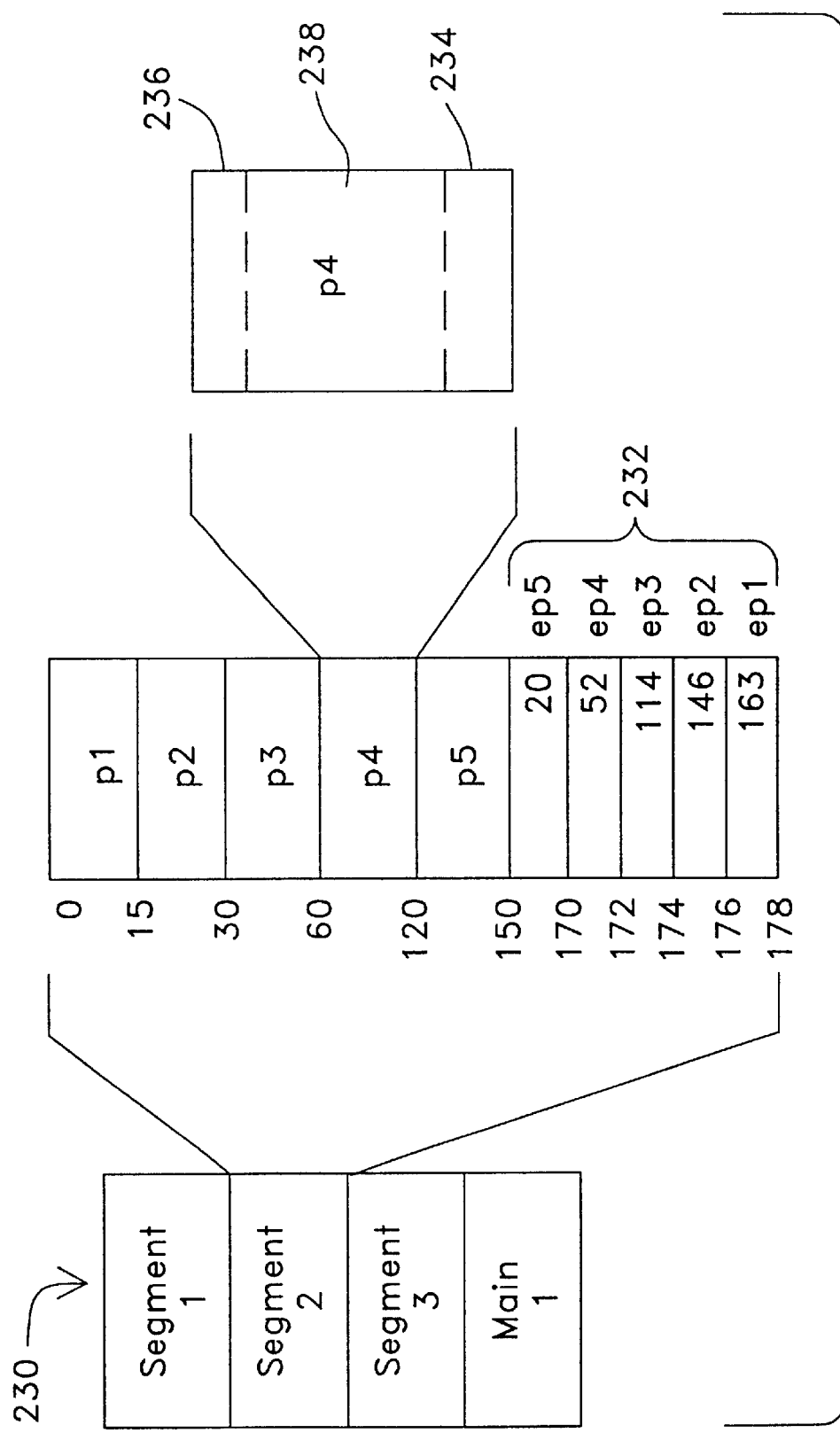
FIG. 3 illustrates in block diagram form an exploded view of segment 2 and procedure 4 of linked software load main1.

The linker of the invention has now completed linking modules 1, 2, 3, 4, and 5, as shown in FIG. 3 and described in more detail below. It is understood, of course, that there are numerous different loadbuilding tools that link procedures to form a final software load, including proprietary loadbuilding tools. It is understood that the present invention does not depend on the specific loadbuilding tools that may be used to compile and link to create the software load.

2.0 Removal of Unused Procedures

Once the unused procedures are identified, a linker or other loadbuilding tools are adapted by the present invention to remove the unused procedures from the software load. Different methods of the present invention for removing procedures are discussed below. Before discussing removal procedures, we discuss how a procedure call is done. A procedure call is accomplished by using the segment number and procedure number to uniquely identify the procedure to be called. The segment numbers are assigned by the linker at link time and depend upon the structure of the load. The segment numbers are assigned based on the order of the segments listed in the link control file, which lists the segments to be linked together for a particular load, and essentially correspond to the particular modules that are used by the software load. The compiler assigns the procedure number for a particular procedure at compile time. The procedure numbers are based on the order in which the procedures are declared. The segment number, procedure number pair uniquely identify a given procedure across the entire load. Each segment has a procedure directory, which provides access to the individual procedures defined within that segment. The procedure directory is a simple table of self-relative jumps where entry number one contains the distance to the header for procedure one, entry number two contains the distance to the header for procedure two, etc. FIG. 3 shows the linked software load 30 comprising modules 1, 2, 3, and main1. Segment 2 is expanded to show procedures p1, p2, p3, p4, and p5 contained therein and procedure directory 232. Procedure directory 232 shows entry points ep1, ep2, ep3, ep4, and ep5 for each respective procedure directory location at 178, 176, 174, 172, and 170, respectively. Procedure directory 232 identifies the self-relative jumps containing the distance (in bytes) to the header of each procedure. For example, jumps to each respective procedure p1, p2, p3, p4, and p5 from each procedure entry point, ep1, ep2, ep3, ep4, and ep5 are 163, 146, 114, 52, and 20, respectively. The procedure directory 232 also shows an expanded view of procedure p4, illustrating that each procedure contains a header 234, trailer 236, and object code 238.

Since the distance to each procedure, also referred to herein as the entry point values, depends on the position of each procedure, the integrity of the procedure directory must be maintained after the unused procedures have been removed from the segment. If this integrity is compromised, then procedure calls made through the procedure directory will point to an incorrect location and the load will act in an unpredictable manner. Several methods of the present invention are used to maintain the integrity of the procedure directories and corresponding segments of a software load are discussed below.

(a) Rewriting Procedure Table and Procedure Calls

The first method of the present invention comprises a linker or other loadbuilding tools that remove all traces of the unused procedures. The linker fixes up each remaining procedure called with a new procedure number. The procedure numbers would no longer be assigned by the compiler but would be assigned by the linker. After removing the unused procedures the linker would create a new procedure directory for any segment, which had procedures removed. The linker would then go back and fix up all procedure calls with the new procedure numbers. By re-writing both the procedure directory and the procedure calls the integrity of the procedure calls is maintained.

There are some complications with this method of maintaining the integrity of the procedure directory after the unused procedures have been removed, which are not immediately obvious. For example, code offsets in the cinfo file are updated by syco™. Cinfo files contain debug information used by the compiler. Code offsets keep track of particular procedures during the compiling and linking process. These Xsyco™ updated offsets are later used by 1 copy (listing generator) and idtrack (cross-reference browser) to allow program designers to set proper breakpoints in native code. If the linker removes a procedure completely, Xsyco™ would not be able to update the cinfo file properly. Each module is typically used in many loads. For example, if a particular procedure is p10 in load A, and p15 in load B, a debugger would become confused, at best. This could be handled by having a different set of cinfo and cross-reference files for each load. However, this would increase disk usage by approximately 3.8 gig per weekly loadbuild. Other difficulties with the first method for maintaining the integrity of the procedure directory are:

- Once removed, a procedure cannot be patched back into the load.
- Since the procedure numbers would be assigned after the unused procedures had been removed, debugging would become very difficult, as procedures could have different procedure numbers in each load.
- Cross-reference information (cinfo and idtrack files) would grow by a factor of 22 based on the current number of loads used, for example, in the XPM terminals.

(b) Procedure Shell Method

In accordance with the procedure shell method of the present invention, the integrity of the procedure directory and procedure calls of each linked segment are maintained by rewriting each segment such that the procedure directory for each is modified during loadbuilding such that its entry point values point to valid procedures. First, the unused procedures ("not called") have the object code removed leaving only the procedure name (segment number/procedure number), exit code (trailer), and header information. These stripped down procedures are referred to as procedure shells. To maintain the integrity of the procedure directory and the segment, the segment is rewritten at the time the not called procedure(s) are removed. Generally, the procedure shell method of the invention walks through each segment moving "called" procedures into space previously allocated for procedures that had been determined by the invention to be "not called." This process gathers up the memory space used by the previously existing "not called" procedures and accumulates the memory space at the bottom of each respective segment. In more detail, each procedure contains computer code that takes up a certain amount of memory (bytes), which can be represented by a "delta" value. During rebuilding of the segment, the delta starts at zero (0) and then, for each segment, starting at the last procedure and working toward procedure p1, delta is incremented by the size of any removed procedure. If a procedure higher in the segment has been removed, (i.e., closer to location 0) and the current procedure is "called," then move the current procedure up to the next write location. Update the procedure directory entry for that procedure with the pre-determined delta value. Finally, move the procedure directory to the next write location.

Procedure shells methods of the present invention include three main variants: extended shells, empty shells and single shells, which are explained in more detail below.

(i) Empty Procedure Shell Method

Figure 4:
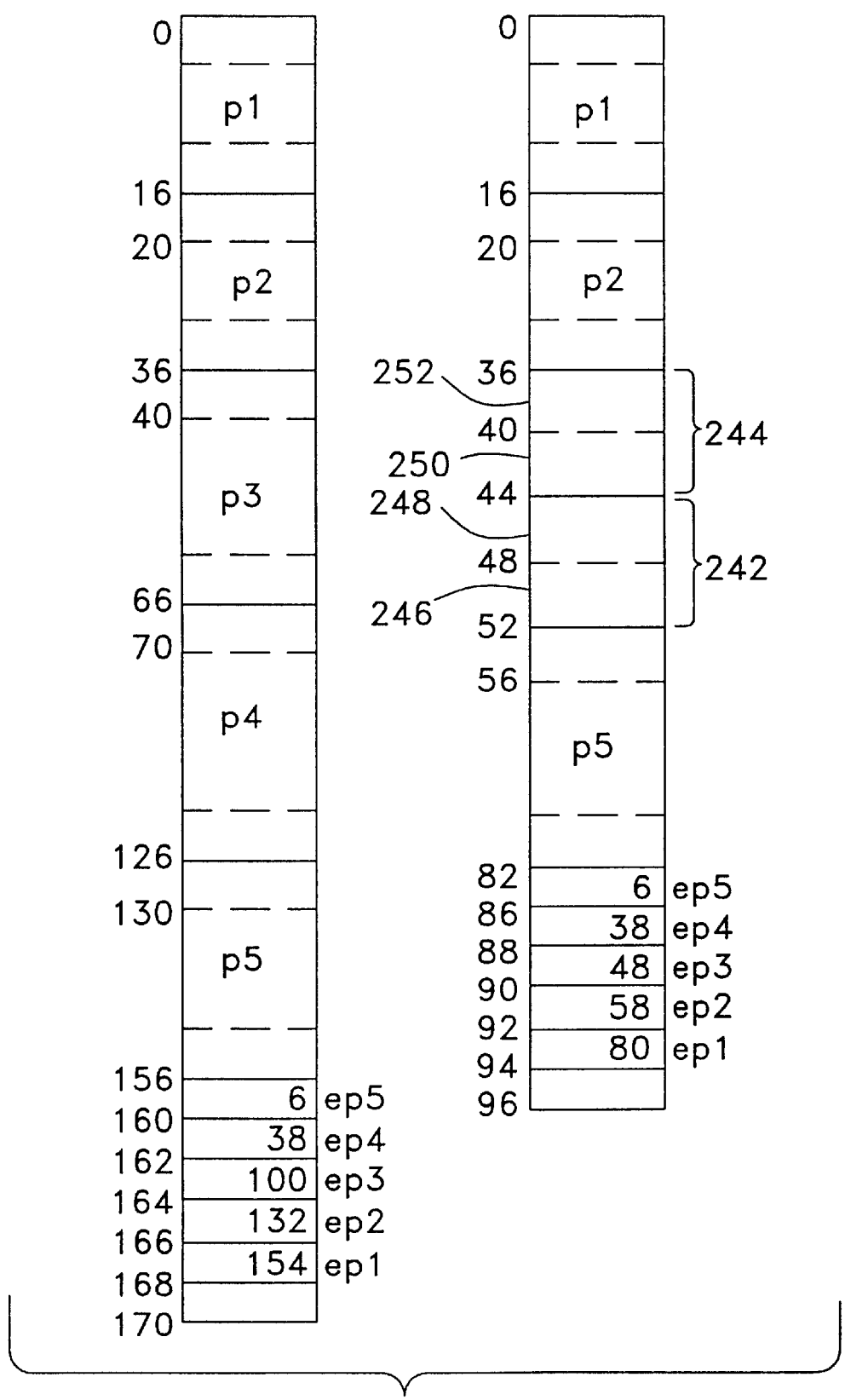
FIG. 4 illustrates in block diagram form the removal of unused procedures from segment 2 of software load main1 in accordance with the empty procedure shell method of the present invention.

The empty shell method of the present invention maintains the procedure directory and procedure call integrity by using a procedure shell that includes no memory space reserved inside the shell for procedure code. Thus, procedures removed using this method cannot be patched back into the load if they are needed later. FIG. 4 illustrates in detail empty procedure shells 242, 244 as shown by the expanded view of segment 2 of software load 230 (FIG. 3). Empty procedure shells 242, 244 include headers 248, 252 and trailers 246, 250, with no memory space left inside for later patching the removed procedure back in. Each header 248, 252 and trailer 246, 250 take four (4) bytes of memory. FIG. 4 shows that that procedures 1, 2, 3, 4, and 5 of segment 2 are 20, 20, 30 60, and 30 bytes, respectively. When a procedure is called, each procedure entry is through the trailer as is known in the art. Procedure directory entry point values corresponding to ep1, ep2, ep3, ep4, and ep5 are relative from the next address: e.g., if the value at location 160 is read six (6), the place holder is now at 162 in order to get back to location 156, the procedure p5 entry point. Thus, the procedure directory offset for procedure p5 is 6.

Referring again to FIG. 4 and by way of example, we step through the segment rewriting method, which is generally applicable to all procedure shell methods and the tombstone method of the present invention.

Identifying the Delta Values.

Initially, the delta value, which is the amount of memory corresponding to the "not called" or unused procedures, is set to zero (0). Procedure p5 lives (determined by the invention and by way of example and described above as "called"). Thus, the delta value remains zero (0). Procedure p4, however, is dead (determined by the invention and by way of example and described above as "not called"). Thus, delta is incremented by the size of memory space attributable to procedure p4, e.g., delta=sixty (60). In this example, the invention has also determined that procedure p3 is dead. Thus, the delta value is incremented by the size of the memory space attributable to procedure p3, e.g., delta= ninety (90). Procedure p2 and procedure p1 both live. Therefore, the delta value remains at (90). The next step in the method of the invention is to process all procedures. Remember, for all procedure shell methods of the invention, the header and trailer for each dead procedure are not removed with the corresponding procedure code. For FIG. 4, 16 bytes of memory corresponding to the headers and trailers 252, 250, 248, and 246 (hereinafter referred to as the "value HT") of dead procedures p3 and p4 remain in segment 2 after removal of the procedure code corresponding to procedures p3 and p4.

Processing all Procedures:

1. Set the next write location to zero (0) corresponding to procedure p1.
2. Process procedure p1 to determine that procedure p1 lives. No removed procedures have been encountered.
3. Keep procedure p1 at the same location.
4. Update procedure directory entry with delta value of old (154) less delta value (90)+value HT of (16)=new self-relative jump value of (80).
5. Move the next write location to (20) and begin processing of procedure p2.
6. Determine that procedure p2 lives and, thus, procedure p2 stays in the same location.
7. Update procedure directory entry value with delta value old (132) less delta value (90)+value HT of (16)=(58).
8. Move the next write location to (40) and begin processing of procedure p3.
9. Procedure p3 is dead.
10. Update procedure directory entry value with old value (100) less delta value (40)+½ value HT of (8)=(48).
11. Procedure p4 is dead. Procedure directory entry value remains the same at (38), as delta value and value HT now both equal (0).
12. Procedure p5 lives. Thus, move procedure p5 from location 130 to location 52.
13. Update procedure directory entry value to old value (6) less delta (0) and value HT of (0)=6.
14. Move the next write location to (86).

Move Procedure Directory.

Move the procedure directory to location 86.

Update Segment Header Information with New Procedure Directory Location.

In this example, ninety (90) bytes of memory are recovered for use by other software load applications.

The advantages of the empty shell method is that no XPM-resident tool changes are required, and the shell is a valid that can be handled by current XPM-resident and non-resident tools. The disadvantages are: (1) there is a memory cost of a basic procedure shell for each removed procedure; (2) once a procedure is removed, it cannot be patched back into a load; and (3) procedure shells can be mistaken for normal procedures.

(ii) The Extended Procedure Shell Method

Figure 5:
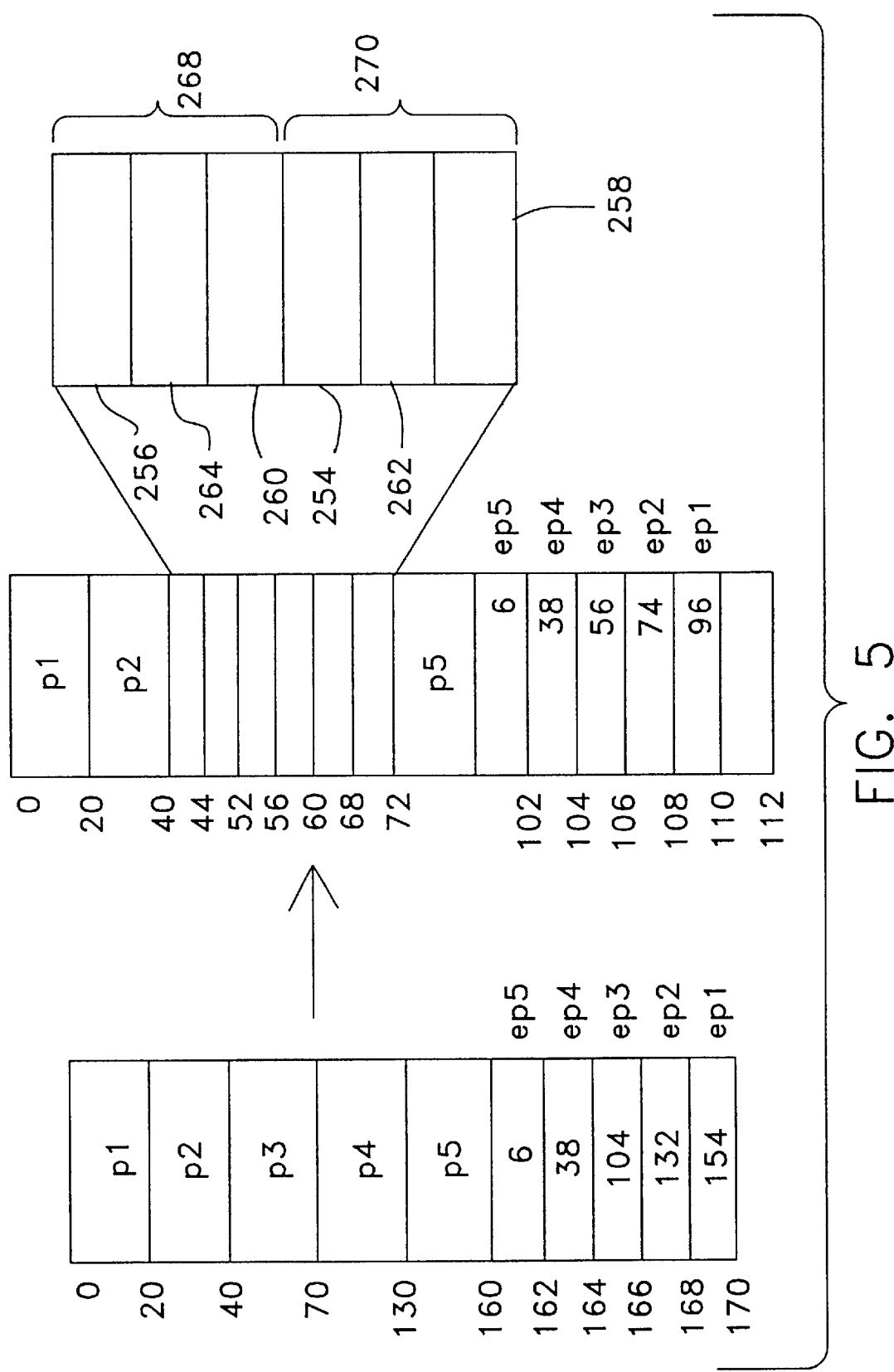
FIG. 5 illustrates in block diagram form the removal of unused procedures from segment 2 of software load main1 in accordance with the extended procedure shell method of the present invention.

The extended procedure shell method is an extension of the empty procedure shell method. The extended procedure shell method uses the basic procedure shell to maintain the integrity of the procedure table and procedure calls. Referring to FIG. 5, extended procedure shells 268 and 270 are expanded. Extended procedure shells 268, 270 retain headers 254, 256 and trailers 258, 260, respectively, but also include extended memory spaces 262, 264 referred to as non-operational space (NOP) to patch procedures p3 and p4 back into the load, if necessary. Each NOP requires 8 bytes of memory, enough memory for jump code instructions patched in to cause a jump to the new procedure location and for the necessary return code instructions. FIG. 5 shows segment 2 of a linked software load main1 and illustrates in more general terms rewriting of segment 2 for the extended shell method of the invention. The procedure for rewriting segment 2 is the same as the rewriting procedure described in relation to the empty shell method above and, thus, a description of the rewriting method of the invention is not repeated.

The advantages of the method using the extended shell concept are:

A procedure can be patched back into a load if it was removed from the original load and is required later (e.g. a patch to the load references it).

No XPM-resident tool changes are required.

Since the shell is a valid procedure all tools can process the shells without enhancement.

The disadvantages are:

Reserving the extended shell space costs memory.

Procedure shells can be mistaken for normal procedures.

(iii) Single Procedure Shell Method

Figure 6:
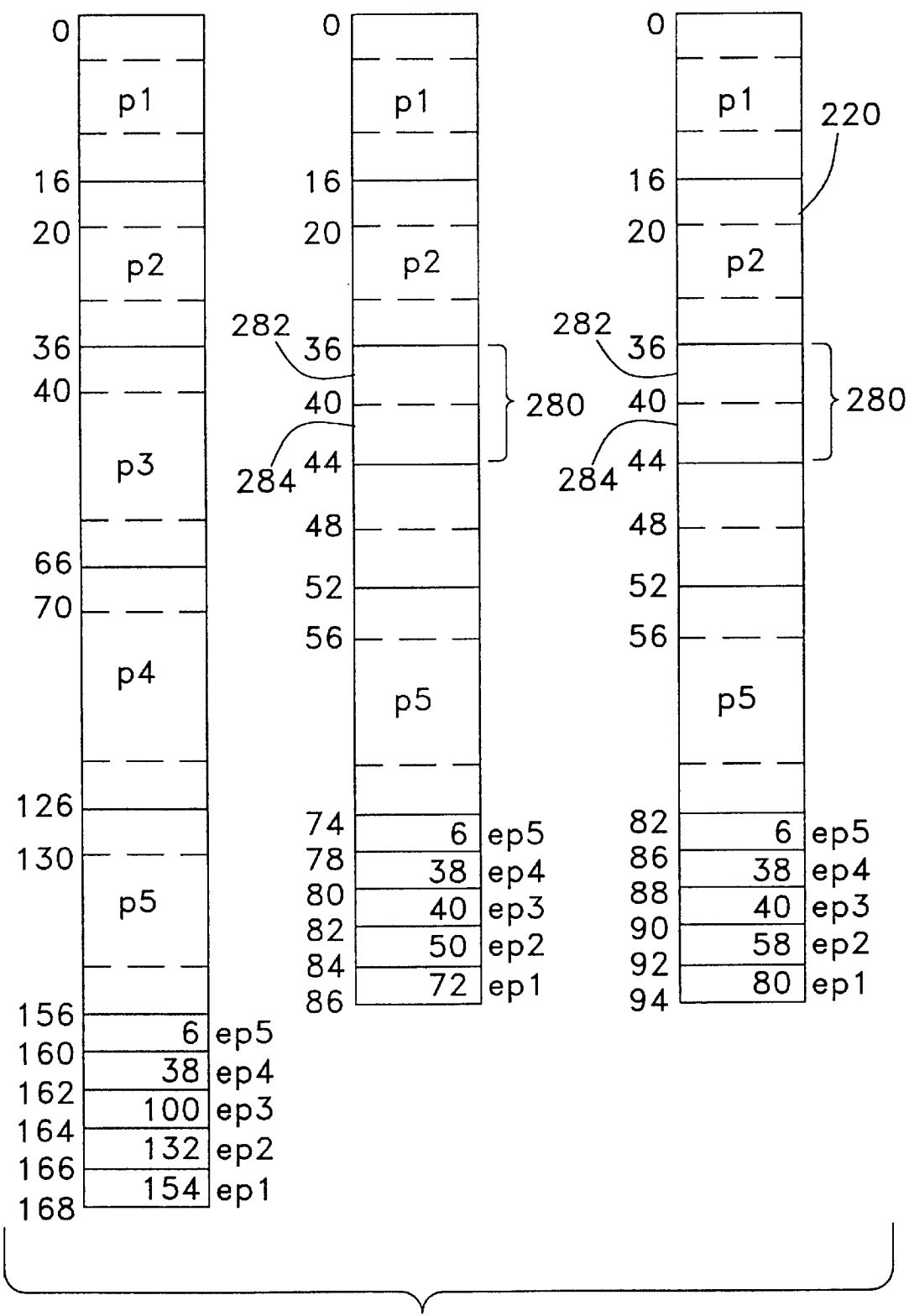
FIG. 6 illustrates in block diagram form the removal of unused procedures from segment 2 of software load main1 in accordance with the single procedure shell method of the present invention.
Figure 7A:
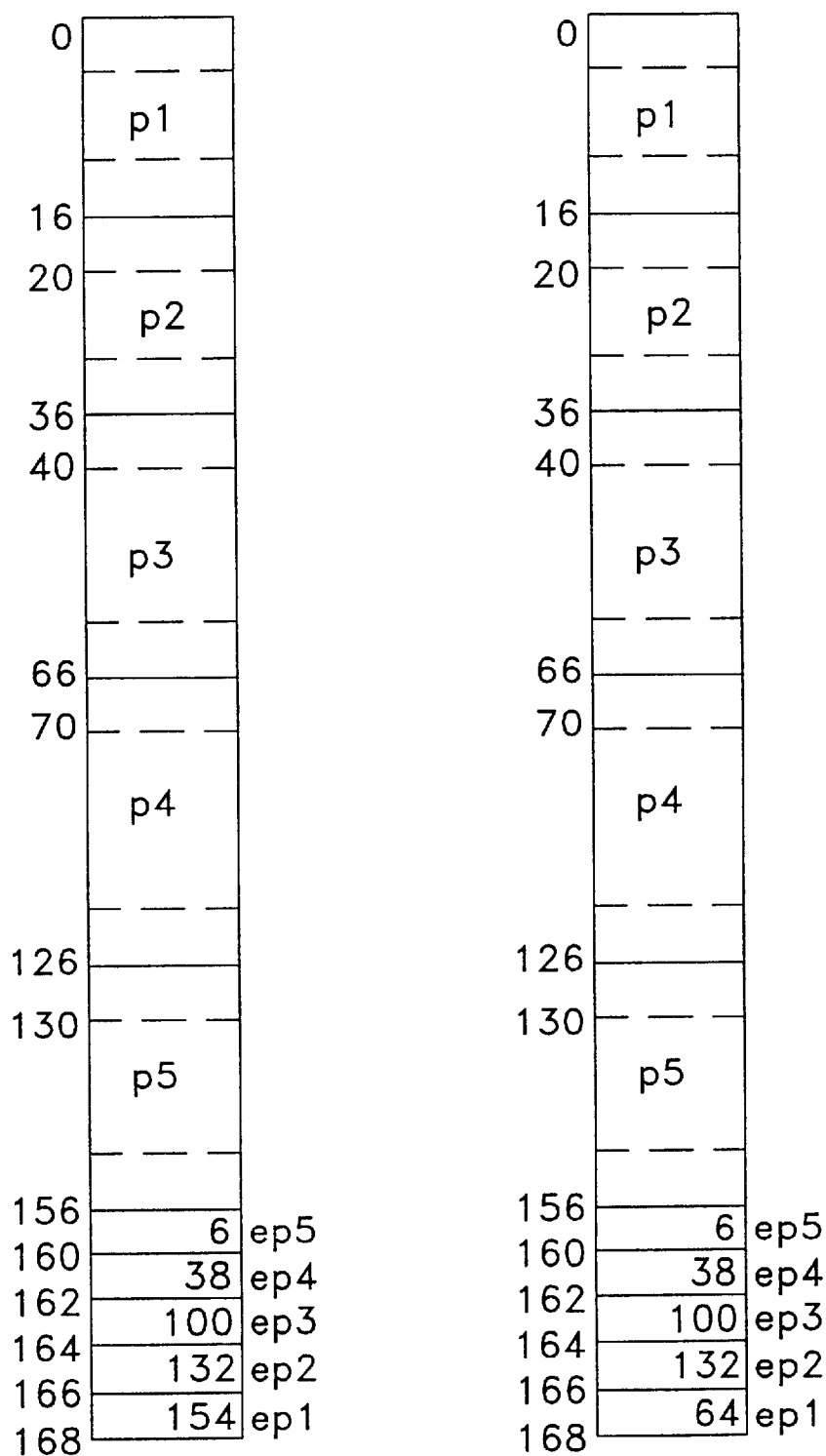
Figure 7B:
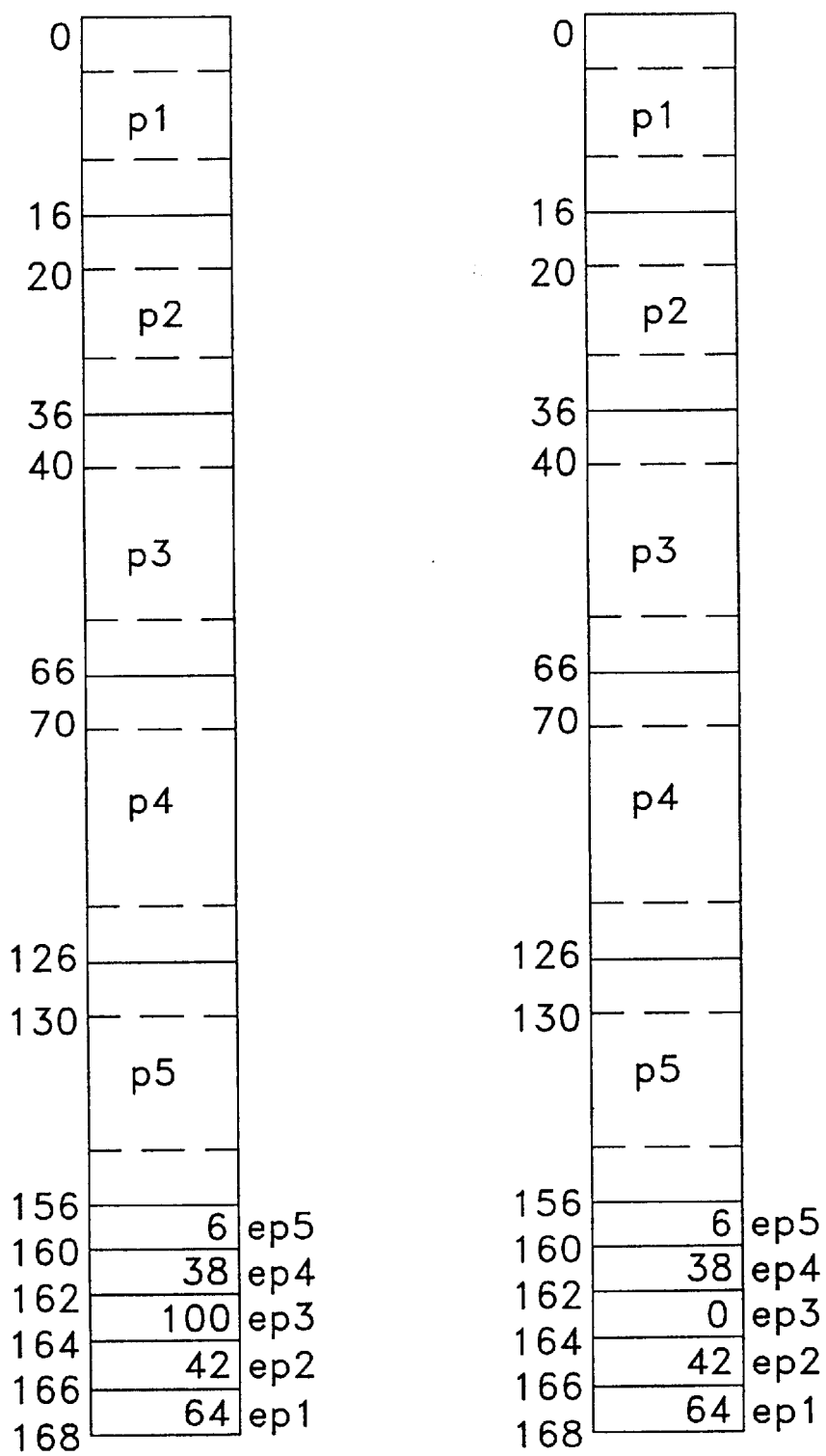
Figure 8A:
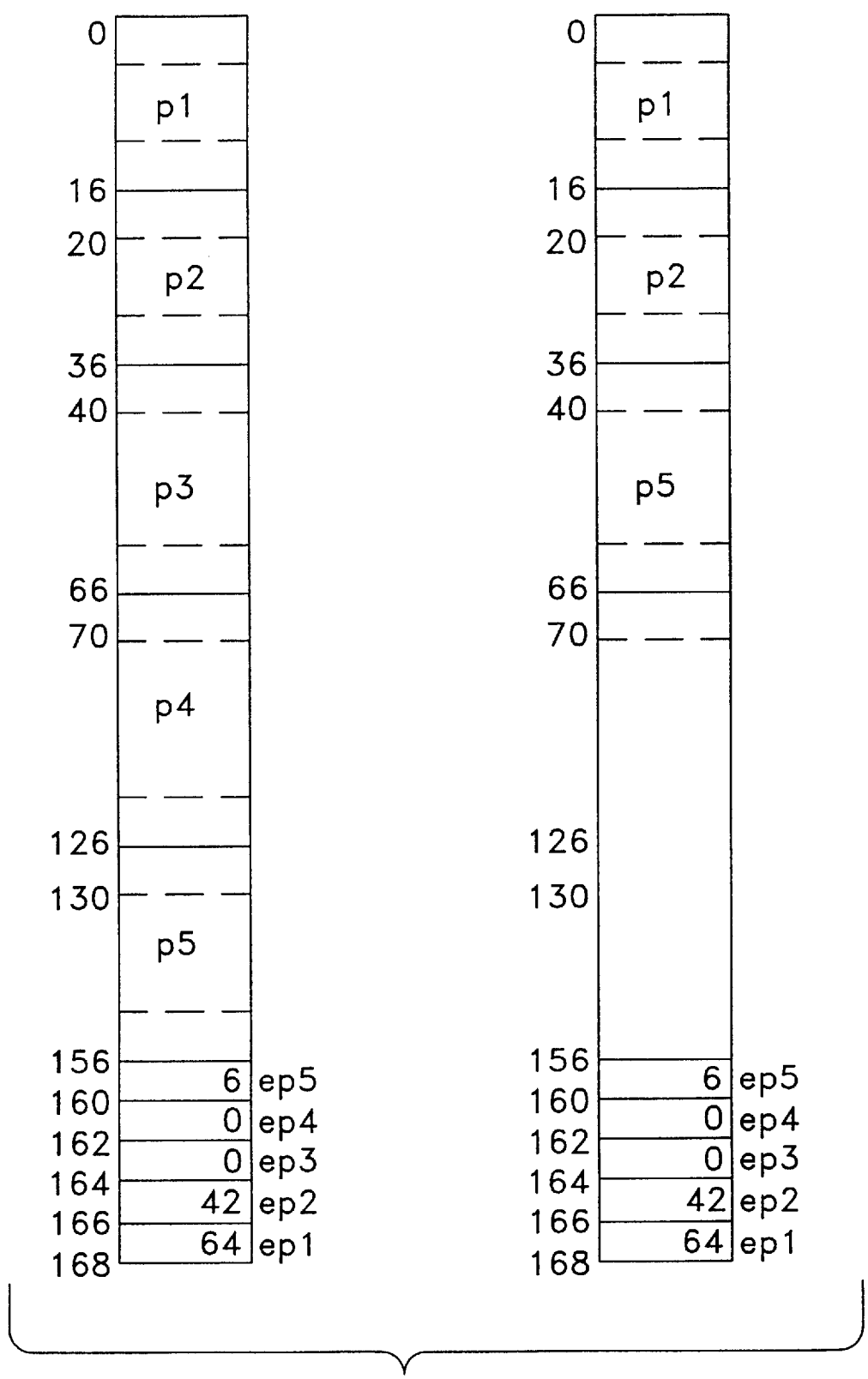

This is a further refinement of the empty shell solution. This solution also maintains the integrity of the procedure directory, the corresponding segment, and the procedure calls by way of the rewriting segment method of the invention discussed in detail above. Referring to FIG. 6, the single procedure shell method generates at most one basic procedure shell 280 per segment. When the first unused procedure is removed, a basic procedure shell 280 is created and the procedure directory entry value for that removed procedure is changed to point at shell 280. Procedure shell 280 includes header 282 and trailer 284, and can contain a non-operational space (NOP) as does extended shells 244, 242 shown in FIG. 5. For any other unused procedures defined in the same segment, their procedure directory entry value points to basic procedure shell (280) created for the first unused procedure. The advantages of the single shell method requires less memory than either the extended shell or empty shell solutions, and also does not require changes to the XPM-resident toolset. However, the disadvantage of the single shell method of the present invention is that memory must be allocated to basic procedure shell (280) for each segment having at least one removed procedure. Furthermore, once a procedure has been patched in, no other procedure for that segment can be patched into the load. Furthermore, procedure shells can be mistaken for normal procedures.

c. Tombstone in the Procedure Directory.

By placing a tombstone value in the procedure directory, referred to herein as the tombstone method, the integrity of the procedure directory and the procedure calls is maintained. The tombstone value is essentially a placeholder in the procedure directory corresponding to each removed procedure. The tombstone method recovers, as a result of removing the "not called" procedures, more memory than the procedure shell methods described above. When using tombstone values, the linker or Xsyco™ removes each of the "not called" procedures, including the procedures' headers and trailers, and place in each corresponding procedure's procedure entry location the tombstone value of zero (0). The tombstone value signifies that a procedure entry had been in this location but had subsequently been removed from the load. Thus, even though the procedure no longer exists the procedure numbers remain unchanged. Since the procedure directory entries are self-relative jumps, a special tombstone value of zero (0) would indicate to XPM-resident and non-resident tools, or to other software loadbuilding tools used to build software loads for PC applications, for example, that no corresponding procedure existed for this entry. The advantages of the tombstone method are that it recovers the most memory, and it is easy to distinguish between a tombstone and a normal procedure. The disadvantages of this procedure are that (1) once removed, a procedure cannot be patched back into a load; (2) some XPM-resident tools may have to be updated to understand a procedure directory value of zero (0); and (3) some real-time impact as xfastcall and get enteric routines have to be updated to check for the tombstone value.

FIGS. 7A, 7B, 8A and 8B illustrate in detail rewriting segment 2 in accordance with the tombstone method of the present invention. Referring to FIGS. 7A, 7B, 8A and 8B, the delta values are determined in accordance with the above description of the empty procedure shell method. Segment 2 procedures are processed as follows:

1. Set the write location to zero (0) corresponding to procedure p1.
2. Process procedure p1 to determine that procedure p1 lives. No removed procedures have been encountered.
3. Keep procedure p1 at the same location.
4. Update procedure directory entry with delta value of old (154) less delta value (90)=new self-relative jump value of (64).
5. Move the next write location to 20 and begin processing of procedure p2.
6. Determine that procedure p2 lives and, thus, procedure p2 stays in the same location.
7. Update procedure directory entry value with delta value old (132) less delta value (90))=(42).
8. Move the next write location to location 40 and begin processing of procedure p3.
9. Procedure p3 is dead.
10. Update procedure directory entry value to a tombstone value (0).
11. Begin processing procedure p4. Procedure p4 is dead. Procedure directory entry for procedure p4 is set to a tombstone value (0).
12. Procedure p5 lives. Thus, move procedure p5 from location 130 to location 40.
13. Update procedure directory entry value to old value (6) less delta (0)=(6).
14. Move the next write location to location 70.

Move Procedure Directory.

Move the procedure directory to location 70.

Update Segment Header Information with New Procedure Directory Location.

Using the tombstone methods, in this example, 106 bytes of memory are recovered for potential use by other software load applications.

Loadbuilding done in accordance with the above described method and apparatus of the present invention was tested on a sample set of software loads with the following results:

| Method/ load | extended shell | empty shell | single shell | tombstone | Memory recovered |
| --- | --- | --- | --- | --- | --- |
| Eci | 54 k | 58 k | 61 k | 75 k | 54 k–75 k |
| Eli | 74 k | 79 k | 83 k | 101 k | 74 k–101 k |
| Odi | 55 k | 58 k | 61 k | 72 k | 55 k–72 k |
| Odt | 104 k | 113 k | 122 k | 154 k | 104 k–154 k |
| Ogi | 86 k | 91 k | 96 k | 113 k | 86 k–113 k |
| Olg | 54 k | 59 k | 63 k | 77 k | 54 k–77 k |
| Xli | 67 k | 73 k | 77 k | 93 k | 67 k–93 k |
| xm2 | 63 k | 67 k | 79 k | 82 k | 63 k–82 k |
| Xsc | 62 k | 66 k | 68 k | 80 k | 62 k–80 k |

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. In a system for building a software load including starting with software modules containing procedures comprised of software code, compiling the modules and linking them to form the software load of linked sections each containing procedures and a procedure directory for providing access to the procedures, a method of identifying and removing unused software procedures from the software load, the method comprising:

a) defining each procedure in said modules;
   b) defining each entry point of said software load;
   c) defining each procedure call instruction of said modules;

d) defining all required procedures of said software load;

e) forming a link record for each said module comprising each said defined procedure, entry point, procedure call instruction; and required procedure;

f) creating a call graph of said software load;

g) creating a procedure management table;

h) processing said call graph to identify all called procedures of each module;

i) identifying all remaining procedures as not called in said procedure management table; and j) rewriting, during linking of said modules to form linked segments, said segment to remove said not called procedures to form said software load having a reduced memory footprint.

2. A method for identifying and removing unused software procedures as recited in claim 1, wherein rewriting said not called procedures during building of said software load further comprising removing the computer code and leaving the header and trailer of each said not called procedures to form a procedure shell for each said not called procedure of each said segment.

3. A method for identifying and removing unused software procedures as recited in claim 1, wherein removing said not called procedures during building of said software load further comprises removing the computer code and leaving the header and trailer of each not called procedure, and replacing said computer code of each not called procedure with sufficient space so that each not called procedure can be patched back in.

4. A method for identifying and removing unused software procedures as recited in claim 1, wherein removing said not called procedures during building of said software load further comprises removing all not called procedures and placing a tombstone value in said procedure directory in said procedure entry locations corresponding to each said not called procedures so as to maintain the integrity of said procedure directory, wherein the use of a tombstone value optimizes memory recovery.

5. A method for identifying and removing unused software procedures as recited in claim 1, wherein removing said not called procedures during building of said software load further comprises forming one procedure shell for all not called procedures for each said segment.

6. A method for identifying and removing unused software procedures as recited in claim 5, wherein removing said not called procedures during building of said software load further comprises leaving in said procedure shell sufficient space so that one not called procedure can be patched back in.

7. A method for identifying and removing unused software procedures as recited in claim 4, wherein removing said not called procedures during building of said software load further comprises using the value zero(0) for the tombstone value.

8. An apparatus for building a software load based on software modules containing procedures, procedure call instructions, and entry points to the software load, the software load containing linked segments, comprising:

a) a linker comprising:
   i) means for defining each said procedure in said modules;
   ii) means for defining each said entry point of said software load;
   iii) means for defining each said procedure call instruction of said modules;
   iv) means for defining all required procedures of said software load; and
   v) means for forming a link record for each said module comprising each said defined procedure, entry point, procedure call instruction; and required procedure; and b) means for linking said modules comprising;
   i) means for creating a call graph of said software load;
   ii) means for creating a procedure management table;
   iii) means for processing said call graph to identify all called procedures of each said segment;
   iv) means for identifying all remaining procedures as not called in said procedure management table; and
   v) means for rewriting, during linking of said modules to form said linked segments, said segment to remove said not called procedures to form said software load having a reduced memory footprint.

* * * * *